United States Patent [19]
Kupelian

[11] 3,867,126
[45] Feb. 18, 1975

[54] COLD AND FROST TOLERANCE IN LIVING PLANTS WITH 3,6-DIOXO-4-PYRIDAZINE ACETIC ACID DERIVATIVES

[75] Inventor: Robert Howard Kupelian, Yardley, Pa.

[73] Assignee: American Cyanamid Company, Stamford, Conn.

[22] Filed: Sept. 15, 1972

[21] Appl. No.: 289,525

[52] U.S. Cl............................................. 71/92, 47/2
[51] Int. Cl................................................. A01n 9/22
[58] Field of Search................................ 71/92; 47/2

[56] References Cited
UNITED STATES PATENTS
3,491,095  1/1970  Knoevenagel et al. ................. 71/92
3,759,689  9/1973  Hageman et al. ...................... 71/76

*Primary Examiner*—James O. Thomas, Jr.
*Attorney, Agent, or Firm*—H. G. Jackson

[57] ABSTRACT

The invention is a novel method for protecting living plants from injury due to cold or frost by applying thereto a protective amount of a 3,6-dioxo-4-pyridazine acetic acid derivative.

9 Claims, No Drawings

COLD AND FROST TOLERANCE IN LIVING PLANTS WITH 3,6-DIOXO-4-PYRIDAZINE ACETIC ACID DERIVATIVES

BACKGROUND OF THE INVENTION 3,6-Dioxo-4-pyridazine acetic acid derivatives and their method of manufacture are described in U.S. Pat. No. 3,491,095 (1970) to Kurt Knoevenagel et al. The patentees indicate that the named compounds have utility as plant growth regulators and may be used to inhibit growth of plants over a wide range of concentrations. They also suggest that the compounds can be used to stimulate the formation of fresh shoots and new branches, or to delay blossoming in ornamentals or crop plants, such as vegetables. However, there is no indication or suggestion by the patentees that a very minor amount of a 3,6-dioxo-4-pyridazine acetic acid derivative applied to plants prior to or during budding, flowering and/or fruiting, and prior to subjection of the treated plants to cold or frost, will protect the plants from injury due to cold or frost.

SUMMARY OF THE INVENTION

The invention is a novel method for improving cold and frost tolerance in budding, flowering and fruiting plants by applying to the plants an effective amount for protecting the plants against injury due to cold or frost of a compound, a tautomer of a compound, or a mixture of compounds having the structure:

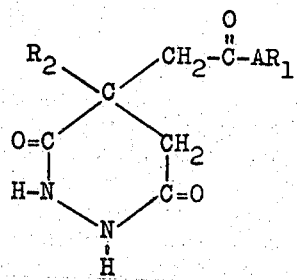

where A is oxygen or -NH-; $R_1$ is hydrogen or alkyl $C_1$–$C_6$; $R_2$ is hydrogen, hydroxyl or

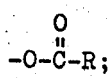

R is alkyl $C_1$–$C_6$, alkenyl $C_1$–$C_6$ or phenylene, and when $R_1$ and $R_2$ are taken together they can form a methylenoxy bridge.

DESCRIPTION OF THE INVENTION

The invention is a method for protecting budding, flowering and fruiting plants against injury due to cold or frost by applying to the plants compounds as described in the Summary, above. The compounds are highly effective for improving cold and frost tolerance in fruit trees, winter vegetables and field crops when they are applied to the surfaces thereof at very low rates and/or in low concentrations.

Where winter vegetables and field crops are concerned, or when application of the active compound is made by the low volume technique, the amount of compound necessary to improve cold or frost tolerance in the treated plants is generally referred to in terms of weight units of compound per acre of treated crop. However, where fruit trees are the subject of application, or where application of the active material is made in the form of a dilute solution, the amount of compound employed to induce cold and frost tolerance is usually referred to in parts per million of active compound in solution.

To achieve cold and frost tolerance in fruit trees, I have found it particularly important, if not essential, to maintain accurate control over the amount of pyridazine acetic acid derivative applied. In practice, I have found that when the fruit trees are sprayed to wetness with a solution containing about 150 to 2,000 ppm. of the pyridazine derivative in solution, enhanced cold and frost tolerance is achieved without injury to the trees. However, I also find that when fruit trees are sprayed with solutions containing substantial concentrations of the active compound, chemical burn or injury to the reproductive organs of the trees can occur. I have also found that winter vegetables and field crops are less susceptible to injury than are fruit trees, and can be treated at as much as twice the rate of active compound employed for enhancing cold and frost tolerance in the trees without any untoward effects. Nevertheless, it is generally desirable to employ from about 0.13 pound to 1.6 pounds per acre of the pyridazine acetic acid derivative to enhance cold and frost tolerance in these crops.

Among the fruit trees which may, advantageously, be treated with the pyridazine acetic acid derivatives described above are peach, pear, apple, apricot and cherry, and the citrus fruits, such as oranges, lemons, grapefruit, tangerines, tangelos and kumquats. Tomatoes, lettuce and corn constitute the main body of winter vegetables and field crops which may advantageously be treated with the above-named compounds.

In practice, the pyridazine acetic acid derivatives of this invention are generally applied in an aqueous solution. The active compound may be dissolved in water and applied as such as a liquid spray.

Inasmuch as the active compounds have good water solubility and are relatively insoluble in lower alcohols, lower ketones, tetrahydrofuran, and the like, formulating the compounds as wettable powders, emulsifiable concentrates, or the like, is not required. However, spreaders, stickers, surfactants, or the like, may be added to the aqueous solutions if one desires to do so.

The invention is further illustrated by the examples below.

EXAMPLE 1

Establishment of frost tolerance in field crops is demonstrated by the following tests wherein field-grown soybeans are treated eight weeks after planting with an aqueous solution of 4-hydroxy-3,6-dioxo-hexahydro-pyridazinyl-(4)-acetic acid. Application rates are at 1, 2 and 4 pounds per acre, and the aqueous solution of the above-named compound is applied to the soybean plants which are in the 7 to 8 trifoliate leaf stage. The solution is applied as a spray (27 gallons per acre) using fan tee jet nozzles, and plants are permitted to mature under normal field conditions for about 4 ½ months after treatment. On November 1, after several nights of frost, all plots are examined and observations recorded. The following rating system is used.

RATING SYSTEM

| | |
|---|---|
| Very Green | = Many green stems and leaves present. |
| Green | = Many green stems and some green leaves present. |
| Light Green | = Some green stems present. |
| Brown | = Virtually no green stems or green leaves present. |

FROST HARDINESS OF SOYBEANS

| Compound | Treatment lbs./acre | Observations |
|---|---|---|
| 4-hydroxy-3,6-dioxo-hexahydro-pyridazinyl-(4)-acetic acid | 1.0 | Light Green |
| 4-hydroxy-3,6-dioxo-hexahydro-pyridazinyl-(4)-acetic acid | 2.0 | Green |
| 4-hydroxy-3,6-dioxo-hexahydro-pyridazinyl-(4)-acetic acid | 2.0 | Green |
| 4-hydroxy-3,6-dioxo-hexahydro-pyridazinyl-(4)-acetic acid | 2.0 | Green |
| 4-hydroxy-3,6-dioxo-hexahydro-pyridazinyl-(4)-acetic acid | 4.0 | Very Green |
| 4-hydroxy-3,6-dioxo-hexahydro-pyridazinyl-(4)-acetic acid | 4.0 | Very Green |
| 4-hydroxy-3,6-dioxo-hexahydro-pyridazinyl-(4)-acetic acid | 4.0 | Very Green |
| None | — | Brown |

These data show that soybean plants treated with 4-hydroxy-3,6-dioxo-hexahydro-pyridazinyl-(4)-acetic acid were much less susceptible to injury due to cold and frost than were the untreated controls.

EXAMPLE 2

Improvement in cold and frost tolerance in budding and flowering fruit trees is demonstrated in the following tests.

In these tests, which are conducted in the state of Oregon, D'Anjou pears, which are at about 40 percent bloom in mid-April, are sprayed until they are wet with an aqueous solution containing 1,000 ppm., 2,000 ppm. or 4,000 ppm. of a mixture of tautomers of 4-hydroxy-3,6-dioxo-hexahydro-pyridazinyl-(4)-acetic acid. The night temperature on control and treated limbs is then lowered to 24°F. for one hour, and 30 hours after treatment all limbs are examined and injury, if any, noted and recorded. Results obtained are as follows:

| | |
|---|---|
| Check | 89% of the flowers and buds were frost killed. |
| 1000 ppm. | 12.7% of the flowers and buds were frost killed. |
| 2000 ppm. | 18% of the flowers and buds were frost killed and some chemical burn was noted. |
| 4000 ppm. | 41.9% of the flowers and buds were frost killed and substantial chemical burn was observed. |

EXAMPLE 3

Improvement in cold and frost tolerance in budding and flowering fruit trees is further demonstrated by the following tests wherein D'Anjou pears in the late dormant stage are sprayed with aqueous solutions containing 1,000 ppm. or 2,000 ppm. of 4-hydroxy-3,6-dioxo-hexahydro-pyridazinyl-(4)-acetic acid. When the buds are susceptible to frost or cold injury, i.e., when silver tips and blooms are evident, the temperature is taken down to 25°F. on five successive nights. The trees are permitted to blossom and fruit, and all are examined for injury. Limbs treated with solutions containing 1,000 ppm. or 2,000 ppm. of 4-hydroxy-3,6-dioxo-hexahydro-pyridazinyl-(4)-acetic acid showed 10 percent or less frost kill and no chemical injury. Untreated controls showed severe kill due to frost.

I claim:

1. A method for improving cold and frost tolerance in living plants, comprising:
applying to the surfaces of the plants before the plants are subjected to cold temperatures and frost and prior to and during the budding, flowering and fruiting stages of the plants, an effective amount for protecting the plants against injury due to cold and frost of a compound, a tautomer of a compound or a mixture of compounds having the structure:

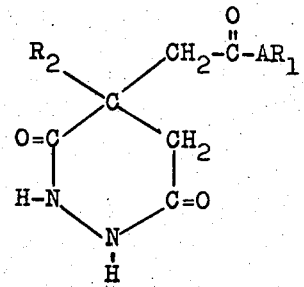

wherein A is oxygen of -NH-; $R_1$ is hydrogen or alkyl $C_1$-$C_6$; $R_2$ is hydrogen, hydroxyl or

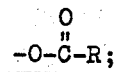

R is alkyl $C_1$-$C_6$, alkenyl $C_1$-$C_6$ or phenylene, and $R_1$ and $R_2$ taken together form a methylenoxy bridge.

2. A method according to claim 1 wherein the compound is applied at the rate of from 0.13 pound per acre to 1.6 pounds per acre.

3. A method according to claim 2 wherein the compound is 4-hydroxy-3,6-dioxo-hexahydro-pyridazinyl-(4)-acetio acid.

4. A method according to claim 2 wherein the compound is applied to winter vegetable or field crops.

5. A method according to claim 4 wherein the compound is 4-hydroxy-3,6-dioxo-hexahydro-pyridazinyl-(4)-acetic acid.

6. A method according to claim 1 wherein the compound is applied in an aqueous solution containing 150 ppm. to 2000 ppm. of said compound.

7. A method according to -dioxo-hexahydro-pyridazinyl-(6 wherein the compound is 4-hydroxy-3,6-dioxo-hexanhydro-pyridazinyl-(4)-acetic acid.

8. A method according to claim 6 wherein the compound is applied to fruit trees.

9. A method according to claim 8 wherein the compound is 4-hydroxy-3,6-dioxo-hexahydro-pyridazinyl-(4)-acetic acid.

* * * * *